COMPUTER FUNCTION GENERATOR

Filed March 25, 1958

HERMAN SCHMID
INVENTOR

BY Richard D. Stephens
ATTORNEY 2,950,399
Patented Aug. 23, 1960

2,950,399

COMPUTER FUNCTION GENERATOR

Herman Schmid, Binghamton, N.Y., assignor to General Precision, Inc., a corporation of Delaware Filed Mar. 25, 1958, Ser. No. 723,755

10 Claims. (Cl. 307—88.5)

This invention relates to improved apparatus for generating output potentials having magnitudes which vary as functions of input independent variables. In the electrical arts generally, and particularly in the analog computer, automatic control and instrumentation arts, electrical potential function generators are widely used; particularly for generating output voltages which vary as trigonometric functions of an independent input variable voltage. One type of prior art function generation is commonly known as diode function generation. If capable of providing the required accuracy for some applications the diode function generator is usually complex and expensive, it requires tedious calibration, and its accuracy is adversely affected by changes in diode emissivity due to ageing or temperature. A further known type of function generator, often called the "photoform" type, has limited accuracy and requires precise calibration. Probably the most common and widely used function generators are potentiometers and resolvers. Since these function generators require independent variable inputs in the form of mechanical shaft inputs, servo-positioning means are most frequently required, and the resulting function generator dynamic response becomes poor. The present invention utilizes very simple circuitry, is very accurate, has quite acceptable dynamic response, and being completely transistorized is very reliable.

Therefore it is a primary object of the invention to provide improved electronic non-linear function generating apparatus;

It is another object of the invention to provide improved electronic arc sine and arc cosine function generators;

It is a further object of the invention to provide improved electronic sine and cosine function generators;

It is yet another object of the invention to provide improved electronic function generators which are simple, accurate, which require no complex adjustment, which are reliable, which have low output impedance and which have high input impedance.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figures 1, 2:
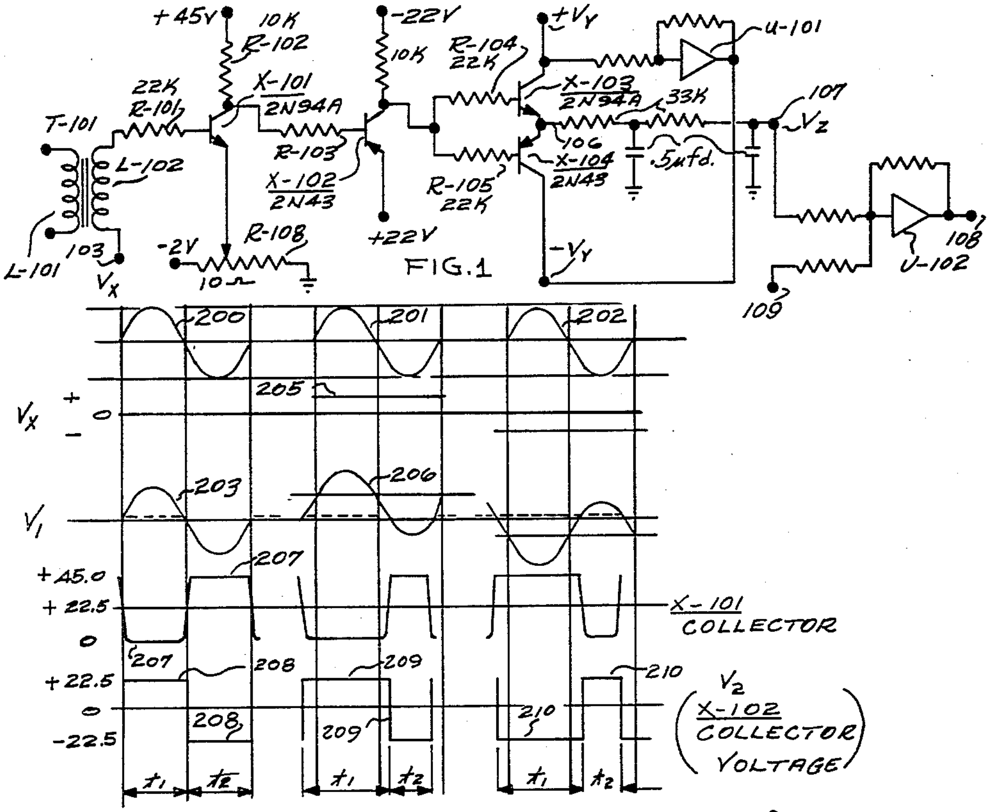
Fig. 1 is an electrical schematic diagram of an illustrative embodiment of an arc sine function generator constructed in accordance with the present invention.
Fig. 2 is a chart of various waveforms from the apparatus of Fig. 1, helpful in understanding operation of the specific embodiment shown in Fig. 1.

Fig. 1 illustrates an exemplary arc sine function generator constructed in accordance with the invention. A sinusoidal voltage input from an alternating voltage source (not shown) is applied to the primary winding L–101 of transformer T–101. An input voltage $V_x$ commensurate with a first independent variable $x$ is applied to terminal 103, i.e., between terminal 103 and ground, so that the independent variable voltage $V_x$ determines the D.C. level of secondary winding L–102 of transformer T–101. The alternating voltage induced in the secondary winding of the transformer, super-imposed on the independent variable input voltage $V_x$ is applied via resistor R–101 between base and emitter of PNP transistor amplifier X–101. Various other methods of superimposing direct and alternating voltages are known and may be substituted without departing from the invention. The output voltage on the collector of transistor X–101 is coupled via resistor R–103 to the base of a further amplifier transistor X–102.

The two amplifier stages shown together constitute a "squaring amplifier" which is designed to saturate when an input signal greater than about 10 millivolts is applied between base and emitter of transistor X–101, so that application of an input voltage via R–101 which alternates between positive and negative values provides positive and negative rectangular pulses at the collector of transistor X–102. Variation of the D.C. level of the secondary winding of transformer T–101 varies the relative width of the positive and negative rectangular pulses. Curve 201 in Fig. 2 illustrates the base-emitter voltage applied to transistor X–101 when the value of the independent variable $x$ equals zero. The sinusoidal voltage applied to L–101 is made sufficiently large in magnitude so that the squaring amplifier output swings from saturation in one direction to saturation in the other direction with negligible time between the two conditions.

Several cycles of the sinusoidal voltage applied to transformer T–101 are shown as curves 200, 201 and 202 in Fig. 2. The independent variable voltage $V_x$ is assumed to be zero during the first cycle 200 of the alternating voltage, providing a base-to-emitter voltage $V_1$ at transistor X–101 as shown at 203. It will be seen that voltage $V_1$ is positive for exactly one-half cycle and negative for exactly one half cycle. As voltage $V_1$ goes positive from zero at the beginning of a positive half cycle, the squaring amplifier amplifies this voltage substantially linearly throughout a range of about ten millivolts and then reaches saturation, providing an output voltage $V_2$ of the nature shown at 208 in Fig. 2. If $V_1$ is a 1000 cps. alternating voltage having a peak amplitude of 30 volts, the leading edge of each rectangular pulse of $V_2$ will have a time width of approximately one microsecond, the trailing edge will have a similar time width, and the flat portion of the pulse will have a width of approximately 498 microseconds, it being assumed that the squaring amplifier saturates when its input voltage $V_1$ exceeds ten millivolts. Increasing the ratio between the alternating voltage input and the saturation input voltage will be seen to shorten the time widths of the leading and trailing edges of the $V_2$ voltage pulses. Inasmuch as the edges of the rectangular pulses may be made substantially vertical, it may be assumed for simplicity of explanation that transistor X–101 switches exactly at zero, thereby providing rectangular pulses at $V_2$, and such assumptions will be made hereinbelow.

It will be seen that the positive excursion portion of signal 208 is shown with slightly greater width than the negative excursion portion. This is due to the fact that an input voltage varying between zero and a small positive value is required to drive transistor X–101 between cutoff and saturation, while ideally the transistor is desired to switch at zero potential. Resistor R–108 furnishes a small "offset" voltage to the emitter of X–101, thereby causing transistor X–101 to cutoff and saturate at equal negative and positive base drive voltages, respectively, so that pulses of equal width are derived from the squaring amplifier with zero input voltage $V_x$.

Assume that the *x* variable input voltage increases in a positive sense to a value such as shown at 205 in Fig. 2, during the second cycle of the alternating input voltage. It will be seen that the $V_1$ voltage, shown at 206, now will be positive for more than one half cycle and negative for less than one half cycle. The $V_1$ voltage input to the squaring amplifier will be seen to be positive for 180 degrees of the sine wave plus an angle whose sine equals $2V_{x/Em}$ and negative for 180 degrees of the sine wave minus the angle whose sine equals $2V_{x/Em}$, and the positive and negative pulses from transistor X–101 will have similar time widths. The difference between the opposite polarity pulse widths will be seen to be directly proportional to the arc sine $2V_{x/Em}$. If the peak value $E_m$ of the input sine wave is maintained constant it will be seen that the difference between the opposite polarity pulse widths will vary directly proportionally to arc sine $2V_x$.

In the apparatus shown in Fig. 1, the collector voltage of transistor X–101 swings between approximately the positive supply voltage of +45 volts and ground or zero volts as the transistor X–101 is driven between cutoff and saturation, as indicated by wave 207 in Fig. 2. The pulses from the collector electrode of transistor X–101 are coupled via resistor R–103 to the base electrode of an amplifier shown as comprising transistor X–102 connected in ordinary common emitter fashion. Amplifier X–102, the second stage of the squaring amplifier, amplifies each of the pulses applied to its base, providing a relatively negative output pulse at its collector when a relatively positive input pulse is applied to its base, and providing a relatively positive output pulse at its collector when a negative input pulse is applied to its base. Using positive and negative supply voltages at transistor X–102 as shown in Fig. 1, the collector voltage of transistor X–102 swings from approximately +22 volts at cutoff to −22 volts at saturation, as shown by wave 208 in Fig. 2. The output pulses from amplifier X–102 are applied to two input lines of a transistor switch portion of the invention via resistors R–104 and R–105. For a reason to be described below, it is not necessary that the X–102 collector positive and negative excursions with respect to ground or reference potential be precisely equal, so no critical limitation is placed on the power supply used with the invention.

It will be seen at this point that I have provided means to superimpose a reference alternating voltage and a direct independent variable input voltage, and that I use the superimposed voltage to control a relative pulse-width modulating means, thereby providing pulses of opposite relative polarity having time widths which vary in accordance with the arc sine function of the independent variable input voltage. Although I have illustrated my invention with an arrangement which utilizes a "squaring" amplifier as a pulse-width modulating means, other types of pulse width modulating means are known in the art and may be substituted without departing from the invention. Any device which will produce two distinct output voltages, depending upon whether its input voltage lies above or below a reference level, is suitable. As examples, numerous "Schmidt triggers" known in the art may be used. The squaring amplifier I have shown may be provided with feedback in multivibrator fashion to enhance rapid transition between cutoff and saturation.

The transistor switch is shown as comprising transistors X–103 and X–104, X–103 being an NPN type and X–104 being a PNP type. The emitter electrodes of the two transistors are connected together at terminal 106. Two voltages of equal magnitude but opposite polarity are applied to the collector electrodes of the two transistors, and in Fig. 1 a conventional unity-gain polarity inversion amplifier U–101 is shown connected to serve as a polarity-inversion means, although various other means for providing two voltages equal in magnitude but opposite in polarity are known and may be used. The collector voltages may be made to vary in magnitude and sense in accordance with a second independent variable, termed the *y* variable for convenience.

The operation of transistors X–103 and X–104 is similar in nature to that of an ideal switch. Assume that rectangular pulses, alternately positive and negative, having an amplitude of 10 volts each, are applied to the base electrode of X–103 and X–104 from amplifier X–102. Also, assume that the instantaneous value of the *y* variable is 6, and that voltages having magnitudes of +6 volts and −6 volts are applied to the collector electrodes of X–103 and X–104, respectively. As the leading edge of the rectangular pulse rises from zero in a positive direction, NPN transistor X–103 acts as an emitter follower, and the emitter terminal 106 follows the base input voltage rise very closely. The positive base voltage simultaneously cuts off PNP transistor X–104, which acts as the load impedance for emitter follower X–103. Terminal 106 will follow the base input drive voltage until the latter reaches and begins to exceed the *y* variable voltage. At this point the transistor X–103 collector base junction becomes forward-biased, so that transistor X–103 conducts, and terminal 106 remains very nearly exactly at the *y* variable voltage level as long as the base drive exceeds that level. Actually there will be a small voltage drop, of the order of one millivolt, across the transistors. As the rectangular pulse trailing edge occurs, terminal 106 will remain at +6 volts until the base drive reaches and begins to become less than +6 volts, and then transistor X–103 will function as an emitter follower again, following the base drive voltage down to zero. Upon application of a negative pulse to the bases of transistors X–103 and X–104, PNP transistor X–104 will operate as an emitter follower in a manner similar to that described above, and NPN transistor X–103 will remain cutoff. Thus it will be seen that the transistor switching circuit serves to limit the amplitudes of the rectangular pulses from amplifier X–102 very closely in accordance with the value of the *y* variable. Since the amplitudes of the rectangular pulses are limited by the transistor switching circuit to values less than maximum it will be seen that the precise peak amplitudes of the rectangular pulses derived by the pulse width modulating means becomes immaterial, in the sense that positive and negative excursions need not be made precisely equal.

Inasmuch as the amplitudes of the pulses at terminal 106 are determined by the magnitude of the *y* variable input voltage, and since the difference in widths of the pulses varies in accordance with the angle whose sine is proportional to $V_x$, it will be seen that the difference in areas of the pulses are a function of both the *x* variable input and the *y* variable input. More specifically, if the positive and negative output pulses at terminal 106 are averaged, as by means of a suitable filter, the resulting potential *z* will vary in accordance with the following expression:

$$z = y \text{ arc sine } x$$

Whenever the *x* input variable is zero, the positive and negative pulses, it will be recalled, are of equal time duration, so it will be seen that they will average to zero, providing a zero output voltage at terminal 107, the output terminal of the averaging means. In Fig. 1 a simple RC filter of conventional type is shown as an exemplary pulse-averaging means. If the $x$ variable should increase to one-half the value of $E_m$, the peak value of the alternating input voltage, the pulses of one polarity will have time widths of 180+2(30) or 240 degrees of the reference sine wave, while pulses of the opposite polarity will have time widths of 180−2(30) or 120 degrees. If the pulses of both polarities have an amplitude proportional to the $y$ variable, it will be seen that an output voltage from the filter will vary in accordance with $y$ and in accordance with 240−120 or 120 degrees. Now, as a third example, assume that the $x$ variable increases to the value of $E_m$. The pulses of one polarity will have time widths of 180+2(90) or 360 degrees, while the pulses of opposite polarity will have time widths of 180−2(90) or zero degrees. Under these conditions a steady voltage proportional to the $y$ variable appears at terminals 106 and 107. Thus in the three instances given, with $x$ input voltages at zero, $\frac{1}{2}E_m$ and $E_m$, output voltages proportional to zero, $120y$ and $360y$, respectively, will be obtained, indicating that the circuit operates properly as an arc sine function generator.

It should be apparent that the rectangular pulses applied to transistors X–103 and X–104 should exceed the largest value of $y$ voltage to be applied to the transistor collectors.

It will be seen that increase in the magnitude of $V_x$ above $E_m$ will not affect the output potential, since a continuous voltage having an amplitude of $y$ will continue to be provided at terminal 106. Thus the apparatus of Fig. 1 may be seen to be operative over the first and fourth quadrants only, i.e. from −90° to +90°. The arc sine function is a multi-valued function, as shown in curve 300 of Fig. 3. The apparatus of Fig. 1 may be used for values above and below the −90 to +90 range by addition of constant voltages to the voltage at terminal 107 and by inversion of the output voltage at terminal 107. For example, application of the voltage at terminal 107 to a polarity inversion means, shown in Fig. 1 as comprising an ordinary operational amplifier U–102, provides an output potential at terminal 108 in accordance with the dashed curve 302 of Fig. 3, which may be seen to be the negative arc sine function. Mere addition of constant voltages to the voltages at terminals 107 and 108 will provide any other desired values of the multi-valued arc sine function. For example, addition at terminal 109 of a positive voltage having a magnitude corresponding to the ordinate "$b$" in Fig. 3 to the voltage at terminal 107 will provide an output which varies between +270 and +450 degrees as the $x$ independent variable input varies between −1.0 and +1.0. Such additions may be done in conventional analog computer fashion using a variety of techniques.

The arc cosine function may be derived by modification of the $x$ input. For example, if the $x$ input voltage is subtracted from a constant voltage having the magnitude of the abscissa "$a$" in Fig. 3, it will be seen that an arc cosine output voltage will appear at terminal 107 as the $x$ input voltage is varied throughout its operating range. Fixed voltages which are multiples of 180 degrees may be applied to terminal 109 to be added and subtracted to the voltage at terminal 107, then, to provide any desired number of the multiple values of the arc cosine function. The arc cosine function is shown plotted as curve 303 in Fig. 3.

In most computer, automatic control and instrumentation applications it is somewhat more convenient to and sometimes necessary to use sine and cosine functions rather than their inverse functions, and the present invention affords means for generating sine and cosine functions by incorporation of apparatus of the type described above into feedback amplifier circuitry. It is known in the feedback amplifier art that a given change in feedback current produces an inverse effect on the amplifier output. For example, attenuation of feedback voltage produces an increase in amplifier overall voltage gain. This principle is used in the present invention to convert arc sine and arc cosine function generation into sine and cosine function generation.

Figure 4:
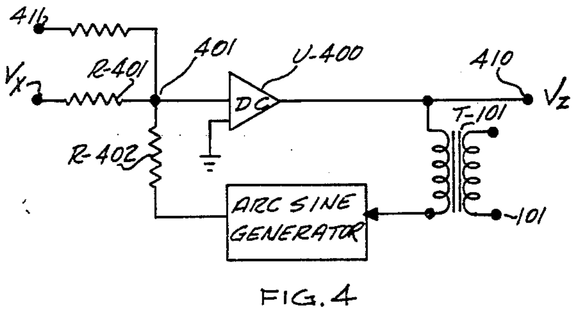
Fig. 4 is an electrical schematic diagram partially in block form illustrating how an arc cosine or arc sine function generator constructed in accordance with the invention may be incorporated into a feedback amplifier to form a cosine or sine function generator.

Fig. 4 shows a conventional D.C. operational amplifier U–400, having a feedback path containing the apparatus of Fig. 1, most of which is shown in block form for sake of simplicity. The direct voltage output of amplifier U–400 provides the bias voltage for the alternating input wave, and the direct voltage output from the arc sine generator is summed with the $x$ variable input voltage at the input circuit of amplifier U–400. Amplifier U–400 is provided with considerable voltage gain, so that any difference between the currents applied via resistors R–401 and R–402 is greatly amplified, producing an output voltage on terminal 410 of sense and magnitude such that the current in resistor R–402 is constrained to almost exactly equal that in resistor R–401. If amplifier U–400 has a gain of several thousand the currents in the two resistors will not differ by more than one part in several thousand, as is well known, and input terminal 401 of amplifier U–400 will be maintained almost exactly at reference or ground potential, one side of the amplifier input circuit being shown grounded. Assuming the currents in R–401 and R–402 to be equal:

$$I_{401}=I_{402} \qquad (1)$$

The current in resistor R–401 will be seen to be proportional to the $x$ independent variable voltage, as follows:

$$I_{401}=\frac{V_x}{R_{401}} \qquad (2)$$

The currents in resistor R–402 will be seen to be proportional to the output voltage of the arc sine function generator, which itself varies as the arc sine function of the amplifier output voltage ($E_o$) at terminal 410. Thus $$I_{402}=\frac{\text{arc sine } E_o}{R_{402}} \qquad (3)$$

Substituting expressions (2) and (3) into expression (1):

$$\frac{\text{arc sine } E_o}{R_{402}}=\frac{V_x}{R_{401}}$$

Therefore:

$$E_o=\sin\left(\frac{R_{402}}{R_{401}}\right)V_x$$

Figure 3:
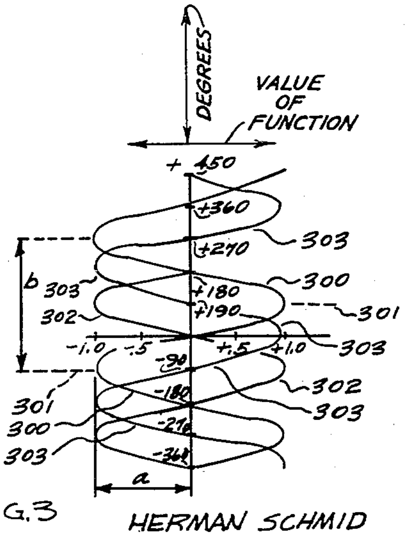
Fig. 3 is a graph illustrating the arc sine and arc cosine functions.

As indicated in connection with Fig. 3 the basic arc sine generator operates over a range of −90 or +90 degrees. If an input voltage greater than that required to provide a −90 or +90 degree output is applied, the function generator output voltage will remain constant at its maximum value as indicated by the dashed lines at points 301, 301 in Fig. 3. When using the function generator of Fig. 1 in an arrangement constructed according to Fig. 4 to provide sine function generation, one should be careful to limit the applied $x$ variable input to values within the 180 degree operating range. Otherwise, the voltage output from amplifier U–400 will rise sharply as a positive or negative limit is exceeded.

The collector voltages of transistors X–103 and X–104 may be varied in accordance with a further independent variable when the apparatus of Fig. 1 is used in the arrangement of Fig. 4, thereby providing an output voltage from amplifier U–400 which varies in accordance with:

$$E_o=\sin k\frac{V_x}{V_y}$$

wherein $k$ is a constant determined by the ratio between input impedance R–401 and the feedback impedance comprised of R–402 and the arc sine generator. It will be recognized that in some embodiments of the invention that a separate resistor need not be provided at R–402, since suitable resistance may be incorporated in the filter circuit used in the arc sine generator. The filter may be designed in accordance with known techniques and need not be described in detail.

It should be apparent at this point that the apparatus of Fig. 4 may be converted as a cosine function generator by converting the arc sine feedback device to an arc cosine feedback device. As mentioned above, this may be accomplished by adding a constant voltage (abscissa "*a*" in Fig. 3) to the input voltage of the arc function generator. This may be done conveniently using the apparatus of Fig. 4 by a number of known summing techniques, such as by application of a fixed voltage to terminal 411 in Fig. 4.

The accuracy of the devices shown in Figs. 1 and 4 may easily be held to better than 0.5% of full scale. However, $I_{co}$, the collector cutoff current and $V_{be}$, the base-emitter voltage of transistor X–101 may change with temperature, which may cause output error. Temperature control and known temperature stabilization techniques may be employed to minimize such errors. The accuracy of the devices also is affected by the shape of the alternating reference voltage used, and distortions of more than 0.5% in the sine wave may prevent overall accuracy of the circuit from reaching 0.5%. It will be apparent at this point that the amplitude of the alternating reference wave must be maintained constant, or alternatively, that the ratio between the alternating reference wave amplitude and the amplitude of any given independent variable control voltage be maintained constant. It will be seen that the device may be constructed so as to provide a high input impedance for the independent variable control voltage $V_x$, very low input impedance, and considerable independence from variations in frequency of the alternating reference carrier.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

While Fig. 1 illustrates typical circuit values for a practical embodiment of the invention such values are, of course, exemplary only and certain departures will become immediately obvious to those skilled in the art in light of this disclosure.

Having described my invention, what I claim as new and desire to secure by Letters Patent is:

1. Electronic function generation apparatus comprising in combination, a source of reference alternating potential; an independent variable input voltage; circuit means for superimposing said potential and said voltage to provide a modulating control voltage; pulse width modulating means controlled by said control voltage; said modulating means being operative to provide a first potential whenever said control voltage is of a given polarity with respect to a reference level and to provide a second potential whenever said control voltage is of opposite polarity with respect to said reference level; a PNP transistor having base, emitter and collector electrodes; an NPN transistor having base, emitter and collector electrodes, said first and second potentials being connected to said base electrodes; and means for applying second and third direct input voltages of equal magnitude and opposite polarity to said collector electrodes, said emitter electrodes being connected together and to pulse-averaging means to provide an output potential from said pulse-averaging means, said first and second potentials being greater in amplitude than the magnitude of said second and third direct input voltages.

2. Apparatus according to claim 1 in which said reference alternating potential comprises a sinusoidal potential, and in which said output potential varies in accordance with the arc sine function of said independent variable input voltage.

3. Apparatus according to claim 1 in which said pulse-averaging means comprises a low pass filter circuit.

4. Apparatus according to claim 1 in which said independent variable input voltage comprises the output voltage of a feedback amplifier having a second input voltage and in which said output potential from said pulse-averaging means is connected to the input circuit of said feedback amplifier to oppose said second input voltage.

5. Apparatus according to claim 1 in which said circuit means for superimposing said reference alternating potential and said independent variable input voltage comprises a transformer, an input alternating voltage being connected to the primary winding of said transformer to induce said reference alternating potential in the secondary winding of said transformer, said independent variable input voltage being applied to said secondary winding to control the direct voltage level of said secondary winding with respect to said reference level.

6. Apparatus according to claim 1 in which said pulse width modulating means comprises a squaring amplifier, at least one stage of which varies between saturation and cutoff as said modulating control voltage alternates between its maximum positive and maximum negative excursions.

7. Apparatus according to claim 1 in which said reference alternating potential comprises a sinusoidal potential, and in said apparatus includes means for subtracting a constant direct potential from said independent variable input voltage, thereby to provide an output potential which varies in accordance with the arc cosine function of said independent variable input voltage.

8. Apparatus according to claim 4 in which said reference alternating potential comprises a sinusoidal potential, and in which said output voltage of said feedback amplifier varies in accordance with the sine function of said second input voltage.

9. Electronic function generation apparatus comprising in combination, pulse-width modulator means for deriving a train of pulses which varies between first and second potential levels for time periods which are functions of an independent variable input voltage, two transistors of opposite conductivity types, the base electrodes of said transistors being connected to said train of pulses, means for applying direct voltages of equal amplitude and opposite polarity to the collector electrodes of said transistors, the emitter electrodes of said transistors being connected together and to a pulse-averaging means to provide an output potential from said pulse-averaging means, said first and second potential levels each exceeding with respect to a reference level said amplitude of said direct voltages.

10. An electronic sine function generator, comprising in combination, a source of sinusoidal alternating potential; a feedback operational amplifier responsive to input and feedback voltages for providing a first continuous voltage; circuit means for superimposing said potential and said first continuous voltage to provide a modulating control voltage; pulse width modulating controlled by said modulating control voltage and operative to provide a second potential which varies between first and second potential levels in accordance with the variation in polarity of said modulating control voltage with respect to a reference voltage level; a PNP transistor having base, emitter and collector electrodes; an NPN transistor having base, emitter and collector electrodes, said second potential being connected to said base electrodes; means for applying second and third direct voltages of equal magnitude and opposite polarity to said collector electrodes; said emitter electrodes being connected together to provide a further pulse train; and a low pass filter circuit connected to average said further pulse train to provide said feedback voltage, said feedback voltage being connected to the input circuit of said feedback operational amplifier.

References Cited in the file of this patent

UNITED STATES PATENTS

| | | |
|---|---|---|
| 2,429,616 | Grieg | Oct. 28, 1947 |
| 2,725,191 | Ham | Nov. 29, 1955 |
| 2,791,644 | Sziklai | May 7, 1957 |
| 2,810,024 | Stanley | Oct. 15, 1957 |
| 2,842,664 | Martin | July 8, 1958 |
| 2,846,630 | Boyle | Aug. 5, 1958 |
| 2,878,384 | Holmes | Mar. 17, 1959 |
| 2,880,332 | Wanlass | Mar. 31, 1959 |
| 2,905,815 | Goodrich | Sept. 22, 1959 |